United States Patent
Lungershausen

(10) Patent No.: US 9,126,631 B2
(45) Date of Patent: Sep. 8, 2015

(54) CONNECTING ARRANGEMENT FOR CONNECTING AT LEAST TWO BODY COMPONENTS OF A MOTOR VEHICLE

(71) Applicant: GM GLOBAL TECHNOLOGY OPERATIONS LLC, Detroit, MI (US)

(72) Inventor: Dirk Lungershausen, Wiesbaden (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/109,315

(22) Filed: Dec. 17, 2013

(65) Prior Publication Data
US 2014/0165341 A1    Jun. 19, 2014

(30) Foreign Application Priority Data

Dec. 17, 2012 (DE) .......................... 10 2012 024 623

(51) Int. Cl.
*B62D 27/04* (2006.01)
*B62D 27/06* (2006.01)
*B62D 29/04* (2006.01)
*F16B 5/06* (2006.01)
(Continued)

(52) U.S. Cl.
CPC .............. *B62D 27/04* (2013.01); *B62D 27/065* (2013.01); *B62D 29/048* (2013.01); *F16B 5/0241* (2013.01); *F16B 5/0642* (2013.01); *F16B 43/02* (2013.01); *Y10T 24/44641* (2015.01)

(58) Field of Classification Search
CPC ........ B62D 24/02; B62D 27/04; B62D 27/06; B62D 27/065; B62D 29/048; F16B 5/06; F16B 5/0642; F16B 5/0607

USPC ........ 296/29, 30, 35.1, 191, 193.01; 403/384, 403/408.1
See application file for complete search history.

(56) References Cited

U.S. PATENT DOCUMENTS

| | | | | |
|---|---|---|---|---|
| 3,382,630 A | * | 5/1968 | Chivers ........................... | 52/208 |
| 4,792,475 A | * | 12/1988 | Bien ............................. | 428/137 |
| 5,037,259 A | * | 8/1991 | Duran et al. ................... | 411/173 |
| 5,150,944 A | * | 9/1992 | Yoshida et al. .......... | 296/203.01 |

(Continued)

FOREIGN PATENT DOCUMENTS

| | | |
|---|---|---|
| DE | 3420696 C1 | 10/1985 |
| DE | 4032808 A1 | 4/1992 |

(Continued)

OTHER PUBLICATIONS

UK Patent Office, UK Search Report for App. No. GB 1321872.2, Jun. 20, 2014.

(Continued)

*Primary Examiner* — Jason S Daniels
(74) *Attorney, Agent, or Firm* — Ingrassia Fisher & Lorenz PC

(57) ABSTRACT

A connecting arrangement is provided for connecting at least two body components of a motor vehicle. The connecting arrangement includes, but is not limited to a pulling device, an elastic clamping element and a pressure distributor provided with a passage opening, which pressure distributor with its passage opening, can be supportingly brought to bear against a surface portion of the body component overlapping with a passage opening of the body component and the clamping element can be interactively arranged on an outside of the pressure distributor facing away from the body component with the pulling device extending through the passage openings of the body component and of the pressure distributor.

19 Claims, 2 Drawing Sheets

(51) Int. Cl.
 *F16B 5/02* (2006.01)
 *F16B 43/02* (2006.01)

(56) References Cited

U.S. PATENT DOCUMENTS

| | | | | |
|---|---|---|---|---|
| 5,542,777 | A * | 8/1996 | Johnson | 403/389 |
| 8,267,003 | B1 | 9/2012 | Lou et al. | |
| 2002/0121793 | A1 | 9/2002 | Rice | |
| 2004/0197136 | A1 | 10/2004 | Emin | |
| 2011/0008126 | A1 | 1/2011 | Schraer | |
| 2013/0031756 | A1* | 2/2013 | Yuen | 24/702 |

FOREIGN PATENT DOCUMENTS

| | | |
|---|---|---|
| DE | 19914932 A1 | 10/2000 |
| DE | 20316215 U1 | 12/2003 |
| DE | 102011107237 A1 | 5/2012 |
| DE | 102012017347 A1 | 3/2013 |
| EP | 0761985 A1 * | 3/1997 |
| FR | 1597182 A | 6/1970 |
| FR | 2712355 A1 | 5/1995 |
| JP | 2007022207 A | 2/2007 |
| WO | 02075170 A1 | 9/2002 |
| WO | 2007021652 A2 | 2/2007 |
| WO | 2012045471 A1 | 4/2012 |

OTHER PUBLICATIONS

German Patent Office, German Patent Search Report for Application No. 102012024623.4, dated Jun. 20, 2013.

* cited by examiner

CONNECTING ARRANGEMENT FOR CONNECTING AT LEAST TWO BODY COMPONENTS OF A MOTOR VEHICLE

CROSS-REFERENCE TO RELATED APPLICATION

This application claims priority to German Patent Application No. 10 2012 024 623.4, filed Dec. 17, 2012, which is incorporated herein by reference in its entirety.

TECHNICAL FIELD

The technical field relates to a connecting arrangement for connecting at least two components of a motor vehicle body, in particular such components which comprise different materials or consist of different materials.

BACKGROUND

To reduce the pollutant emission of motor vehicles it is desirable to reduce the gross weight of the motor vehicle if possible while maintaining the stability and the torsional rigidity of a motor vehicle body. In this regard, light-weight construction materials are increasingly being used for motor vehicles in body construction, such as for example comparatively light metals such as aluminum or magnesium, but also increasingly composite materials, such as for example fiber composite materials.

In particular, carbon fiber materials can have an extraordinarily high pulling strength and a comparatively high e-modulus with comparatively low density. They are therefore suitable to a particular degree for use in motor vehicles. Connecting components based on fiber composite materials to other motor vehicle body components produced for example from metal material however can prove to be particularly difficult. Although it is conceivable in principle to connect a fiber composite material component for example with the help of screws or rivets to adjoining metal components, a maximum tightening torque for example of a screw connection however must not be exceeded since popular fiber composite materials are comparatively brittle and accordingly prone to breakage.

A force introduction and force transmission between composite material body components and metal body components should therefore take place subject to realizing a comparatively large contact area, so that the effect of the pressure in the fiber composite material component distributed over a corresponding contact area does not exceed predetermined limits. A further problem in connecting motor vehicle body components of different materials consists in the different heat expansion of the individual materials. Compared with further body components for example based on metal, fiber composite materials can have a greatly deviating thermal expansion behavior. In the case of highly fluctuating or in extreme temperature conditions, thermally-induced stresses can thus occur in the structure of such a motor vehicle body, as a result of which impermissible compressive stresses for example of the fiber composite component can be exceeded in certain circumstances.

In view of the foregoing, at least one object is to provide an improved connecting arrangement for connecting at least two body components of a motor vehicle, which is suitable in particular for connecting fiber composite materials and which tolerates particularly favorably temperature-induced length expansion effects of the body components even in extreme weather conditions, in particular in the case of particularly high or low temperatures. In addition, other objects, desirable features and characteristics will become apparent from the subsequent summary and detailed description, and the appended claims, taken in conjunction with the accompanying drawings and this background.

SUMMARY

A connecting arrangement is provided for connecting at least two body components of a motor vehicle. The connecting arrangement in this case comprises a pulling device, an elastic clamping element and a pressure distributor provided with a passage opening. The pressure distributor comprises a passage opening, which can be supportingly brought to bear against a surface portion of the body component substantially overlapping a passage opening.

Here, the clamping element is provided for arrangement on an outside of the pressure distributor facing away from the body component. The pulling device is designed in order to extend through the clamping element, the pressure distributor and through the body component. In this regard, the body components, the pressure distributor as well as the clamping element comprise through openings that can be brought to bear against one another in an aligned manner for passing through the pulling device.

The pulling device formed through the assembly of body component, pressure distributor and clamping element provide a pulling force exerted in particular on the outside of the pressure distributor facing away from the body component or on a corresponding outside of the clamping element, so that the pressure distributor subject to exerting a corresponding pulling or compressive force can be held in bearing position against the body component. The pulling device in this regard is designed to exert a pulling or clamping force on the clamping element interacting with it. Since the elastic clamping element supports itself on the pressure distributor or comes to bear against the latter, a corresponding pulling or holding force can be exerted on the pressure distributor in the same manner, as a result of which said pressure distributor can be fixed and held on an adjoining body component for example non-positively.

While the one end of the pulling device interacts with the clamping element, an end of the pulling device located opposite can interact with a further clamping element of a comparable connecting arrangement. There, too, the pulling device can exert a pulling or clamping force in opposite direction on a clamping element designed comparably or identically, which likewise supports itself on an outside of a further body component via a further pressure distributor. In this way, the two body components, subject to generating a pulling force between the ends of the pulling device located opposite one another and by correspondingly generating a pulling force on the clamping elements interacting therewith, can either be non-positively connected directly to one another or subject to the intermediate connection of a further body component for example arranged in between in a clamping manner.

The clamping or holding force in this case preferably extends perpendicularly to the plane of the pressure distributor, which distributes the pulling force to be generated via the pulling device preferably over its entire bearing area that can be brought to bear against the body component. In that in particular the geometrical shape of the pressure distributor is configured to the contour of the body component that can be brought to bear thereon, a comparatively large-area and homogeneous pressure distribution as well as force introduction in the body component can be provided.

In that the clamping element interacting with the pulling device is designed elastically, it can offset in particular thermally-induced length expansion differences of individual body components in a simple manner. Mechanical stresses, due to temperature changes can thus be reduced to a minimum. Permissible compressive stresses on the body component preferably comprising a fiber composite material can thus be reduced to a minimum. Furthermore, the elastic clamping element can also contribute to the vibration and noise damping of the body. By using the elastic clamping element, the propagation of vibrations and structure-borne sound across the connecting arrangement can be actively or passively dampened. The elasticity and mechanical strength of the clamping element in this case has to be carefully matched to the respective requirements, the geometrical configuration of the components involved in the connecting arrangement and the concrete material selection for the body components, for the clamping element and for the pressure distributor.

According to an embodiment, the clamping element comprises a thermoplastic, which under the operating conditions provided for the vehicle, in particular in the temperature ranges provided for the vehicle, has a required elasticity and accordingly mechanical deformation properties. Here, the clamping element can include a thermoplastic in particular.

It can for example be formed as an injection molding, as a single component or multi-component injection molding and according to its geometrical configuration and the concrete material selection have the required elasticity characteristics demanded for compensating thermal changes in length in the body. In particular, the clamping element is configured elastically deformable. In this regard, it is deformable to a certain degree under the effect of a mechanical force corresponding to its elasticity characteristics starting out from a basic configuration. Preferably, upon a diminishing effect of the force, the clamping element reversibly relaxes back into its starting configuration.

According to an embodiment, the clamping element comprises at least one urethane, a polyamide, a polystyrene or a polypropylene or a material mixture formed thereof. The mentioned materials or material classes are particularly well suited in particular for producing an elastic clamping element for the purpose intended here. Such materials can furthermore be brought into any required shape using popular production methods. In addition, compared with metal components, they have a comparatively low specific weight yet adequately high strength so that the clamping element formed from this can provide an adequate force transmission between pulling device and adjoining pressure distributor.

According to a further embodiment, the clamping element has a shore-D hardness of approximately 60 to approximately 110. Preferably, the shore-D hardness of the clamping element is in the range from approximately 70 to approximately 100 or in the range from approximately 80 to approximately 90. Such an elastic clamping element can on the one hand provide a required force transmission between pulling device and pressure distributor. In the mentioned hardness range it is suitable furthermore in order to effectively offset any thermal stresses and in particular such thermal stresses as occur through the effect of temperature in particular following a joining of the body components through reversible elastic deformation.

According to a further embodiment, the pressure distributor on its outside facing away from the body component comprises a spherical cap-like receptacle for receiving the clamping element. A receptacle designed spherical cap-like or spherical or hemispherical can in particular function, with suitably configured clamping element, to also receive pulling forces for example such as act via the pulling device and to discharge these as homogeneously as possible into the pressure distributor and into the adjoining body component, which extends at an angle to the surface normal of the pressure distributor or the body components.

Because of this, forces which in particular act on the pressure distributor in a comparatively oblique manner can be introduced into the pressure distributor in a comparatively homogeneous manner. According to a further embodiment, the clamping element also has a spherical rotation-shaped inside correspondingly designed to the receptacle of the pressure distributor, with which the clamping element supports itself preferably almost over the full area on the receptacle of the pressure distributor. The spherical cap or hemispherical configuration of clamping element and receptacle of the pressure distributor provided for this purpose makes possible a largely homogeneous and even mechanical force effect on the pressure distributor, largely independently of the orientation of the pulling device relative to the extension or geometry of the pressure distributor.

According to an embodiment, the clamping element comprises a passage opening that can be arranged aligned with the passage opening of the pressure distributor. The clamping element is designed in particular in order to be penetrated by the pulling device so that the pulling device can come to bear against the outside of the clamping element facing away from the pressure distributor and by forming a pulling force directed in the direction of the body component can clampingly fix the clamping element on the adjoining body component both in the receptacle of the pressure distributor as well as the pressure distributor itself.

According to a further embodiment, the pulling device comprises a radially expanded flange-like headpiece. The latter supports itself on an opening rim of the passage opening of the clamping element. The flange of the headpiece radially projecting to the outside has a larger diameter than the passage opening of the clamping element, so that a pulling force exerted via the pulling device can be exerted on the opening rim of the clamping element, thus ultimately also on the pressure distributor in a corresponding manner by way of the expanded flange of the headpiece.

In the process, it can be additionally provided according to a further development that the opening rim of the clamping element is formed as a depression substantially accommodating the headpiece of the pulling device flush with the surface. In this way, the headpiece in assembly position of the connecting arrangement can be integrated in the clamping element flush with the surface and in a substantially surface-flush configuration of clamping element and pressure distributor be integrated in the outside of the pressure distributor substantially flush with the surface. In addition to an advantageous spacing saving, the surface-flush configuration of headpiece, clamping element and/or pressure distributor can also counteract any entry of dirt and/or moisture in the relevant connecting point.

According to a further embodiment, the headpiece and the opening rim of the clamping element each comprise an anti-rotation safety structure corresponding to one another. In this way, the headpiece following completed assembly of the connecting arrangement can bear against the clamping element in a manner secured against rotation. This is advantageous in particular when the length of the pulling device for example through rotary motion of headpieces located opposite can be changed relative to one another.

Other configurations are also conceivable here, in which for example a pulling element connected to the headpiece is coupled for example to a screw to change the length of the pulling device. Through the rotationally fixed mutual arrangement of headpiece and clamping element, releasing or unscrewing of the headpiece or of the pulling device for example through vibrations of the motor vehicle body can be effectively countered.

According to a further embodiment that is independent thereof, a motor vehicle body is finally provided that comprises at least two body components, which are connected to one another with a connecting arrangement described before. In particular, the connecting arrangement makes possible forming a mutual pulling or clamping force between the two body components, so that these can be connected to one another in a directly clamping manner or subject to interconnecting a further body component to be clamped in between. In this regard, the connecting arrangement preferably provides a purely non-positive connection of the at least two body components. However, it is not excluded here that the body components are additionally positively fastened to one another for example for forming a captive safeguard or are connected to one another using screws.

According to a further embodiment, at least one of the body components comprises a fiber-reinforced plastic. Here, it can be provided in particular that the body component is formed of such a fiber-reinforced plastic at least in regions. Possible fiber composite materials in particular are thermoplastic materials with a fiber composite structure. According to an alternative configuration, at least one of the body components can comprise a carbon fiber material or be formed of such a carbon fiber material at least in regions. In principle, a wide range of material pairings are conceivable here.

Thus, at least one of the body components can comprise a fiber composite material, in particular a carbon fiber material, while the other body component can be formed of a completely other material, for example of a metal sheet or can comprise such at least in regions. It is also conceivable that the two body components to be connected to one another via the connecting arrangement each comprise a fiber-reinforced plastic, in particular a carbon fiber material or are formed from such at least in regions.

Since the present connecting arrangement provides a mutually clamping connection which offsets thermal tolerances, any material pairings can be reliably and durably connected to one another with the connecting arrangement. In addition to a configuration of at least one body component in the form of a fiber-reinforced plastic or in the form of a carbon fiber material, a fiber-based, in particular carbon fiber-based configuration can also be advantageous for the pulling device.

Following all this, a motor vehicle with a previously described motor vehicle body or with at least one connecting arrangement for connecting at least two body components described before is finally provided according to a further independent aspect.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 4:
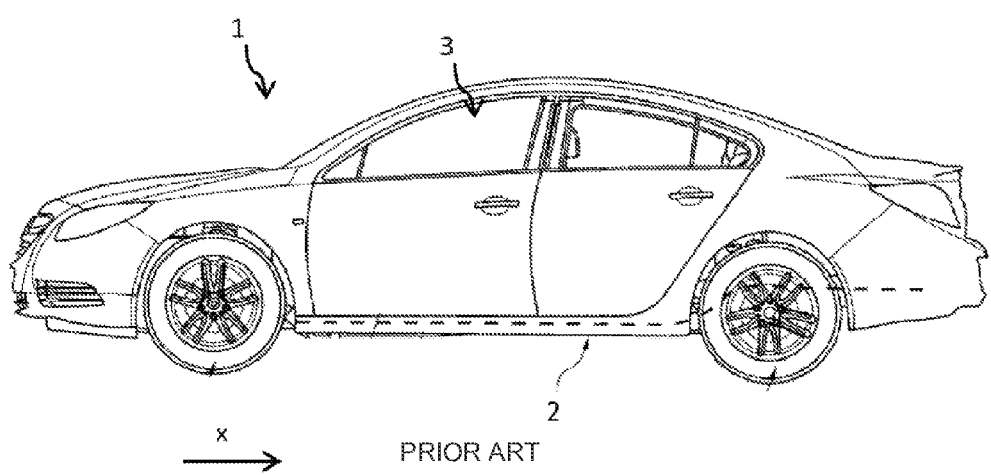
FIG. 4 is a schematic representation of a motor vehicle.

The motor vehicle 1 shown in FIG. 4 comprises a self-supporting motor vehicle body 2. In the schematic representation of FIG. 1, merely two arbitrary body components 11, 12 are exemplarily indicated, which can be non-positively connected to one another with a connecting arrangement 10 described in the following.

The body components 11, 12 can for example be formed as side members running in vehicle longitudinal direction (x) and spaced from one another in vehicle transverse direction (y), for example in the floor region of a motor vehicle passenger cell 3. It is also conceivable that the merely schematically indicated body components 11, 12 are formed for example as a lateral support structure for an instrument panel carrier, which for example extends in between in vehicle transverse direction (y).

Figure 3:
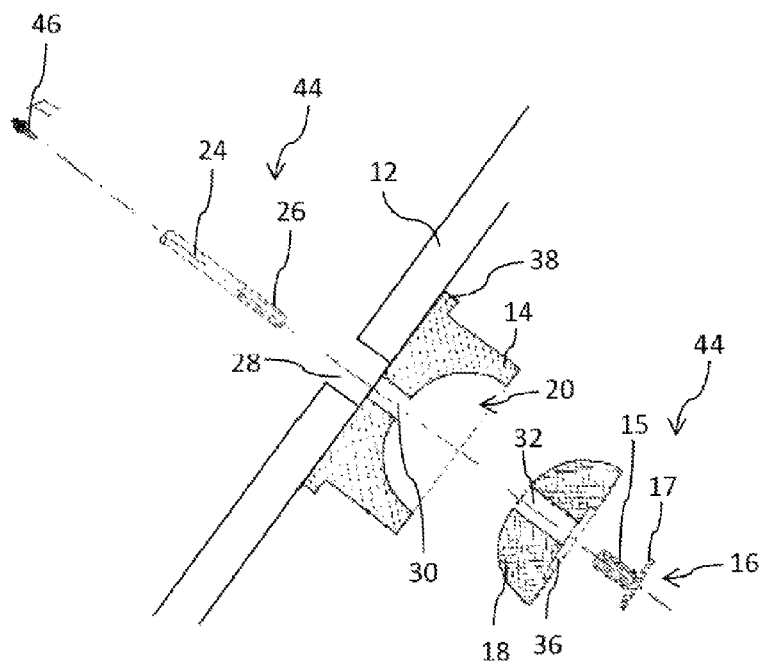
FIG. 3 is a cross section through the connecting arrangement in exploded representation.

Preferably, at least one of the body components 11, 12 is formed as fiber composite material or as carbon fiber material. In order to be able to connect the relevant fiber-based body component 11, 12 for example to a metal component of the motor vehicle body 2, the body component 12, as shown in FIG. 3, comprises a passage opening 28 for receiving a pulling device 44. Aligned with the passage opening 28 of the body component 12, a passage opening 30 of a pressure distributor 14 that can be arranged on the outside of the body component 12 is provided.

Figure 1:
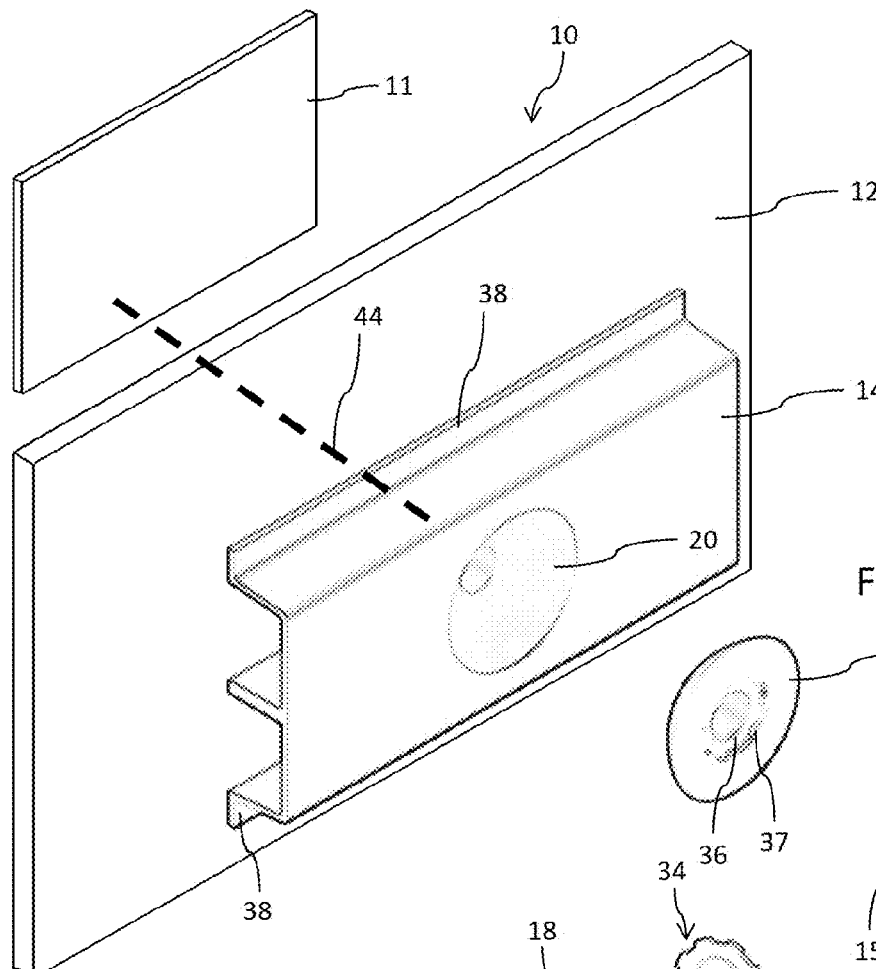
FIG. 1 is a schematic and perspective exploded representation of the connecting arrangement.
Figure 2:
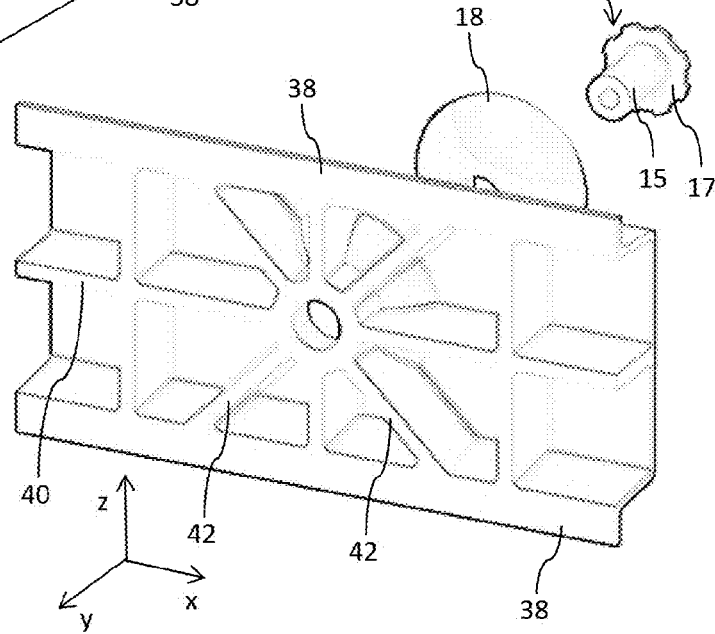
FIG. 2 is a further perspective representation of the connecting arrangement viewed from the side facing a body component.

The pressure distributor 14, as is shown in both FIG. 1 and FIG. 2, can comprises a type of hemispherical support profile, which on its lower side facing the body component 12 comprises a plurality of support webs 40, 42 formed in the manner of a framework or ribbed. In a central region of the pressure distributor 14 provided with flange portions 38 projecting to the outside, a passage opening 30 is formed, which is adjoined by a plurality of support webs 40, 42 in this case a total of eight which are evenly distributed in circumferential direction and radially extend to the outside.

Through the support webs 40 running approximately in horizontal direction as well as through the support webs 42 extending obliquely in the plane of the pressure distributor 14, the central force introduction region of the pressure distributor 14 in particular can be adequately reinforced structurally. The outer marginal flange portions 38 projecting upwards and downwards, the pressure distributor 14 can support itself in the manner indicated in FIG. 1 on the outer surface of the body component 12 facing it. On the outside 13 of the pressure distributor 14, a spherical cap-like or hemispherical receptacle 20 in the form of a depression is provided, which is designed for the accurately fitting receiving of a flexible clamping element 18. Here, the clamping element 18 likewise comprises a central passage opening 32, which upon the assembly as intended on the pressure distributor 14 comes to lie approximately aligned with the passage opening 30 of the pressure distributor 14.

The outer contour 22 of the clamping element 18 facing the pressure distributor 14 has a shape which corresponds to the contour or geometry of the receptacle 20 of the clamping element 14, so that the clamping element 18 located in the receptacle 20 can support itself substantially over the full area on the inner wall of the receptacle 20. The spherical cap-like configuration of receptacle 20 and clamping element 18 serves for a homogeneously and spatially largely evenly distributed force introduction in the pressure distributor 14 thus also in the body components 12.

The clamping element 18 is formed in particular as an elastic clamping element, which comprises a thermoplastic or which is formed of such. Preferably, at least one urethane, one polyamide, one polystyrene or one polypropylene as well as material mixtures arbitrarily formed thereof are possible for the clamping element.

In a preferred configuration, the clamping element has a shore-D hardness of approximately 60 to approximately 110. In this hardness range, the clamping element 18 on the one hand can provide an adequate force transmission between a pulling device 44 acting on the outside of the clamping element 18 and the pressure distributor 14 adjoining the clamping element 18 on the opposite side.

The pulling device 44 penetrating the clamping element 18, the pressure distributor 14 and the at least one body component comprises an elongate pulling element 24, for example in the form of a wire cable or a pull rod, which for example at its end located at the bottom right shown in FIG. 3 comprises a connecting portion 26, for example in the form of an external thread.

The pulling device 44 furthermore comprises a headpiece 16 with a shank 15 receiving the connecting portion 26 of the pulling element 24 and with a radially expanded flange portion 17. The radially expanded flange portion 17 in this case can be inserted flush with the surface into an opening rim formed as a depression on the outside of the clamping element 18 facing away from the pressure distributor 14. In addition, the opening rim 36 schematically shown in FIG. 1 as well as the outer edge 36 each comprise an anti-rotation structure 34, 37 corresponding to one another.

Thus, the headpiece can have a type of serration on the outer edge of its flange portion, which can be inserted in a correspondingly serrated structure of the opening rim 36 of the clamping element 18. Through the anti-rotation structures 34, 37 of headpiece 16 and clamping element 18 which correspond to one another, a rotary movement of the headpiece 16 relative to the clamping element 18 can be substantially prevented, so that a rotary movement of the headpiece 16 relative to the pulling element 24 can be effectively prevented, which could otherwise possibly result in the connecting arrangement 10 being disconnected.

As is shown, furthermore, in FIG. 3, the pulling device 44 serves for exerting a pulling force marked with reference number 46. In this way, a holding or fixing force acting on the outside of the clamping element 18 can be provided via the pulling device 44, which is transmitted via the elastic clamping element 18, via the force distributor 14 and finally to the body component 12.

Although in the present figures it is not explicitly show, the further body component 11 can comprise a corresponding pressure distributor 14 with a clamping element 18 likewise on its outside facing away from the body component 12, which can interact in an identical or similar manner with the pulling device 44 coupling or connecting the two body components 11, 12 together.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A connecting arrangement for connecting at least two body components of a motor vehicle, comprising:
    a pressure distributor provided with a first passage opening, the pressure distributor configured to supportingly bear against a surface portion of a first body component with the first passage opening overlapping with a second passage opening of the first body component, and
    an elastic clamping element on a first side of the pressure distributor facing away from the first body component on a first side of the body component, the elastic clamping element having a third passage opening generally aligned with the first passage opening and the second passage opening; and
    a pulling device including
        a headpiece positioned at least partially within the third passage opening of the elastic clamping element on the first side of the first body component, and
        a pulling element extending through the first passage opening, the second passage opening, and the third passage opening from a second side of the first body component to engage the headpiece such that a pulling force on the pulling element is transmitted to the first body component via the headpiece, the elastic clamping element, and the pressure distributor.

2. The connecting arrangement according to claim 1, wherein the clamping element comprises a thermoplastic.

3. The connecting arrangement according to claim 1, wherein the clamping element comprises a urethane.

4. The connecting arrangement according to claim 1, wherein the clamping element comprises a shore-D hardness of approximately 60 to approximately 110.

5. The connecting arrangement according to claim 1, wherein the pressure distributor on the first side facing away from the body component comprises a spherical cap-shaped receptacle that is configured to receive the clamping element.

6. The connecting arrangement according to claim 1, wherein the clamping element comprises a spherical cap-shaped outside formed correspondingly with the receptacle of the pressure distributor.

7. The connecting arrangement according to claim 1, wherein the headpiece of the pulling device is a radially expanded flange-like headpiece that is self-supporting on an opening rim of the passage opening of the clamping element, the headpiece defining internal threads that engage with external threads on the pulling element.

8. The connecting arrangement according to claim 7, wherein the opening rim is formed as a depression receiving the headpiece in a surface-flush manner.

9. The connecting arrangement according to claim 7, wherein the headpiece and the opening rim comprise an anti-rotation structure each corresponding to one another.

10. The connecting arrangement according to claim 9, wherein the anti-rotation structure of the headpiece and the opening rim is formed by a first serrated structure portion on the headpiece and a second serrated structure portion on the opening rim that engages the first serrated structure portion.

11. The connecting arrangement according to claim 1, wherein the clamping element comprises a polyamide.

12. The connecting arrangement according to claim 1, wherein the clamping element comprises a polystyrene.

13. The connecting arrangement according to claim 1, wherein the clamping element comprises a polypropylene.

14. The connecting arrangement according to claim 1, wherein the pressure distributor includes a second side facing toward the body component, and wherein the pressure distributor further includes marginal flange portions extending from the second side to engage the body component and a plurality of support webs extending from the second side to engage the body component between the marginal flange portions.

15. A motor or vehicle body, comprising:
   a first body component;
   a second body component;
   a connecting arrangement configured to connect the first body component and the second body component, the connecting arrangement comprising:
   a pressure distributor provided with a first passage opening, the pressure distributor configured to supportingly bear against a surface portion of the first body component with the first passage opening overlapping with a second passage opening of the body component, and
   an elastic clamping element on an outside of the pressure distributor facing away from the first body component on a first side of the body component, the elastic clamping element having a third passage opening generally aligned with the first passage opening and the second passage opening;
   a pulling device including
      a headpiece positioned at least partially within the third passage opening of the elastic clamping element on the first side of the first body component, and
      a pulling element extending through the first passage opening, the second passage opening, and the third passage opening from a second side of the first body component to engage the headpiece such that a pulling force on the pulling element is transmitted to the first body component via the headpiece, the elastic clamping element, and the pressure distributor.

16. The motor vehicle body according to claim 15, wherein the first body component comprises a fiber-reinforced plastic or is formed from such at least in regions.

17. The motor vehicle body according to claim 15, wherein the first body component comprises a carbon fiber material.

18. The motor vehicle body according to claim 15, wherein the first body component is formed from a fiber-reinforced plastic at least in regions.

19. The motor vehicle body according to claim 15, wherein the first body component is formed from a carbon fiber material in at least regions.

* * * * *